United States Patent Office 3,425,501
Patented Feb. 4, 1969

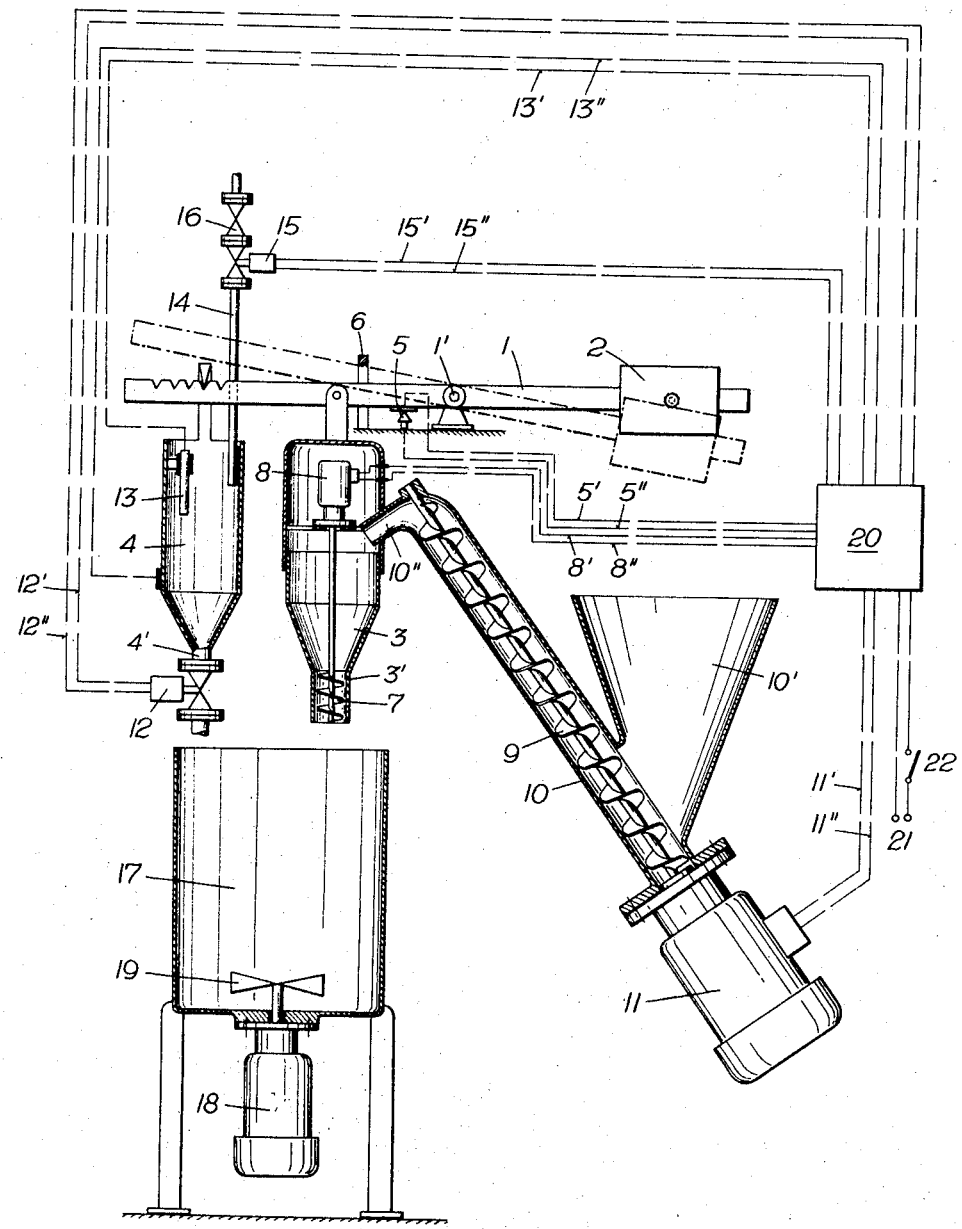

3,425,501
MIXTURE PROPORTIONING APPARATUS
Otto Ganko, Vienna, Austria, assignor to Patentauswertung Vogelbusch Gesellschaft m.b.H., Vienna, Austria
Filed May 16, 1966, Ser. No. 550,473
Claims priority, application Austria, June 3, 1965, A 5,037/65
U.S. Cl. 177—70        7 Claims
Int. Cl. G01g 19/22

ABSTRACT OF THE DISCLOSURE

A device for accurately regulating the proportions of liquid and powdered ingredients of a mixture by causing the amounts of said powder to be determined by the device by continually comparing the weight of said powder, as it is adding said powder to a mixing container, with the weight of the predetermined volume of liquid which the device also adds to the container.

---

The invention relates to a process and apparatus appropriate thereto for the measured addition of powdered materials or a mixture of materials, in particular flour, and of liquids in the preparation of doughs or preliminary doughs, in which the powdered material or the mixture of materials is measured by means of a weighing machine and the liquid by means of a volumetric measure.

Devices for the measured addition of flour and liquids in the preparation of dough are known in which the measuring of the flour is done by weight by means of an automatically operated measuring weighing machine and the measuring of the liquid is done by volume by means of one or more measuring vessels. These known devices are worked by an automatic regulating device which ensures that the flow of the flour and the liquid to the two above named measuring aids, that is, to the measuring scales and to the vessel holding the liquid takes place virtually at the same time. The last also applies to the flow of the two dough components, that is the flour and the liquid, to the dough mixing apparatus. Accordingly, the arrival of the mass of the flour and the liquid in the two measuring aids of the apparatus is achieved practically at the same time. But otherwise the two measuring aids work entirely independently of each other. If, therefore, a change occurs in one of the two measuring aids, e.g. in the measuring scales, as a result of which the amount of material delivered by this measuring aid is altered, this does not at all result in the amount of material delivered by the other measuring aid, i.e., the vessel for the liquid, being altered proportionately, as desired. In operation, as the flour flows from the measuring scales greater or smaller amounts of flour stick to the sides of the measuring scales, whereas the liquid dough component always flows away completely in the prescribed amount. The consequence of this is that every time the dough mixing apparatus is used the relative proportions of the amounts of flour and liquid differ variously from the prescribed proportions, for experience shows that the same amounts of flour never remain in the measuring scales. The dough mixing apparatus therefore produces at each charge dough components whose relative proportions correspond in no way to the prescribed proportions.

In these known devices the weighing scales for the flour can also be shaped like revolving bucket wheels. The open measuring vessels, which also revolve, are filled with the liquid dough components to the top rim, whereby the superfluous amount of liquid flows over the rim of the vessel. A regulating device ensures that the bucket wheel provided for the flour and the measuring vessel for the liquid dough component are turned and therefore emptied at the same moment. Linked to this, the replenishment of the bucket wheel and the measuring vessel is also controlled by the above mentioned regulating device. In such operation, therefore, the two measuring aids, viz. the bucket wheel and the measuring vessel, also work at the same time, but in other ways independently of each other. In the emptying of the buckets the varying amounts of flour which remain behind therefore disturb here also the relative proportions of the amounts of the two dough components which represent a more or less sizeable alteration in the charge entered in the dough mixing apparatus.

Finally, devices are also known in which the balance pans for the flour are shaped as balance containers. In the latter case there is provided at the bottom a closing slider worked by an electric motor. The measuring vessel for the measuring of the liquid dough components is equipped with a float which works an electric contact device. This guides the incoming stream of liquid to a magnetic valve which regulates the supply of liquid dough components to the measuring vessel, and in such a way that, by means of the magnetic valve the supply of liquid to the measuring vessel is interrupted as soon as the liquid has reached the appointed level. A supplementary magnetic valve guides the supply of liquid from the measuring vessel into the dough mixing apparatus. A further guiding device ensures that the supplementary magnetic valve and the first named magnetic valve are both opened at the same time by a closing slider worked by an electromagnet. But a mutual interdependence of function of the two measuring aids is hereby also created in both these known devices. The amount of flour which remains stuck to the walls of the weighing container disturbs the prescribed relative amounts of the two dough components in the same way as was the case in the known measuring devices as described before.

The present invention therefore has the task of creating a process together with the appropriate apparatus, which avoids the disadvantages named above, that is, that it should give a mutually dependent measuring of the powdered and the liquid dough components, which should under all circumstances produce the prescribed proportions of amounts in a completely exact way, in other words, independently of the amounts of powdered matter or mixture of matter which sometimes remains behind in the measuring apparatus. This is achieved in accordance with the present invention in such a way that for the purpose of the measuring of the powdered matter or mixture of matter, the machine with the measured amount of liquid is loaded with the corresponding desired amount of the powdered matter or mixture of matter, and by keeping the balance in equilibrium an amount of said liquid corresponding to the measured amount of the powdered matter or mixture of matter is released. As a result of said release whilst maintaining equilibrium the proportion of the amounts of the powdered matter or the mixture of matter to the amount of the liquid which is injected at each charge into the dough mixing apparatus remains always the same, as it is not affected by the amounts which stick to and remain in the apparatus.

The said powdered matter left behind in the apparatus, when the said liquid has completely run into the dough mixing apparatus, is inseparably connected with a disturbance of the equilibrium of the balance. In the present device a scale beam is used known per se, on which is arranged a vessel to receive said matter to be measured, and on the same scale beam, apart from the vessel to take in the said matter, there is also arranged a vessel to receive said liquid. Because the positions of one of the vessels and of said counterweight are adjustable along said beam, variously prescribed proportions of the amounts of the two dough components can be previously selected and determined.

Further characteristics of the invention are illustrated in the drawing which gives an embodiment of the apparatus of the invention in vertical section.

On one side of the scale beam 1 is a counterweight 2. On the other side of the same scale beam are a vessel 3 which can automatically receive and dispense said matter and vessel 4 which is open on top and can also automatically receive and dispense said liquid. The position of vessel 4 is adjustable along the scale beam 1. As a modification to the present invention, vessel 3 could be constructed so that its position also could be adjustable along the scale beam 1. Furthermore, on the underside of the scale beam 1, that is, to the left of the pivot point 1', an electrical regulating contact 5 is provided. To prevent an excessive swing of the scale beam 1 there is fixed above said beam and to the left of the pivot point 1' a stroke 6. On its bottom end the vessel 3, which tapers off conically toward the bottom, has a vertical outlet nozzle 3' in which there is an ejector and screw conveyor 7 powered by an electromotor 8 attached to the vessel 3 above said ejector and conveyor 9. To fill the vessel a forward screw conveyor 9 is provided. Said conveyor is surrounded by a casing which has at the end away from the vessel 3 a funnel 10'. At the other end of the casing 10 an ejector 10'' is provided which is directed into the top opening of the vessel 3. The forward screw conveyor 9 can be driven by motor 11.

The vessel 4 for the intake of said liquid shows at its bottom end an emptying opening 4'. The ejection of said liquid by means of this emptying opening can be regulated by means of a magnetic valve 12 attached to same. In the upper part of the vessel 4 there is provided a regulating electrode 13 for the volumetric measuring of the liquid for the preparation of the dough, which shuts off the electric current when the level of the liquid in vessel 4 has risen to a predetermined level. In place of the regulating electrode in the vessel 4 it is possible also to provide another device for the volumetric measuring of the amount of liquid, e.g. a float which interrupts the inflow of liquid into the vessel 4 as soon as the level of the liquid has reached a certain level corresponding to the amount of the inflowing dough components. A moveable overflow tube can also serve for the volumetric measuring of the liquid. Entering vessel 4 from above is a liquid inflow conductor 14 in which there is provided a magnetic valve 15 as well as a regulating valve 16. The electric conductors which serve to regulate the apparatus lead from the regulating contact 5 provided on the scale beam 1, further from the electromotor 8, from the driving motor 11, from the vessel 4 and the regulating electrode 13, as well as from the magnetic valves 12 and 15, to a relay combination 20 housed in the switch case. The electric conductors concerned are indicated respectively by 5, 5''; 8', 8''; 11', 11''; 13', 13''; 12', 12'' and 15', 15''. The relay combination 20 is connected by means of a lead 21 in which there is a switch 22 to the electrical circuit. Under the vessels 3, 4 the dough mixing vessel 17 is fixed in which there is a mixing blade 19 which can be driven by an electromotor 18. The dough mixing vessel is advantageously equipped so that the dough or preliminary dough made in it can be drawn away from it continuously.

The various positions available for the pivot points of vessels 3 and 4 and counterweight 2 with respect to pivot point 1' result in a very great number of mixture proportions which can be attained. The pivot points of vessel 4 and counterweight 2 are varied until it is found that they produce the prescribed proportions of the powdered and liquid dough components desired.

Before starting the process the input funnel 10' is filled with flour. At this point the vessel 3 which serves for the intake of the flour to be measured and the vessel 4 for the intake of the said liquid are both empty. As a result the left side of the scale beam 1 is unloaded and has swung upwards as is indicated by a dotted line. By adjusting the position of vessel 4 and counterweight 2 along the scale beam 1, the relative proportions of the amounts of the dough mixing components which are to be injected into the dough mixing vessel 17 in one run, i.e. the flour and the liquid, are predetermined. Now the supply of current from the electrical circuit to the relay combination 20 is effected by means of the switch 22.

From this point onwards the operation is directed completely automatically by means of the relay combination 20 over the following switch steps:

In switch step I a time relay belonging to the relay combination 20 is started, the purpose of which will be described later. At the same time the driving motor 11 is switched on over the electrical circuit 11', 11''. driving the screw conveyor 9 which pushes flour into the vessel 3 for the length of time necessary to bring the scales in equilibrium. As a result of the electrical regulating contact 5 fixed on the scale beam 1 is closed by the opposite stroke of its two contact halves which has the result that the relay combination 20 is switched onto the next switch step II over the leads 5', 5''.

In this next switch step II the driving motor 11 attached to the conveyor screw 9 is put out of action; as a result further supply of flour to the vessel 3 is stopped. At the same time the magnetic valve 15 over the electric leads 15', 15'' is opened, so that the liquid dough components, particularly the water necessary for the preparation of the dough flows through the liquid input channel 14 into the vessel 4. At this time the magnetic valve 12 fixed to the bottom side of this vessel is closed. The electromotor 8 is switched on over the electric leads 8', 8''. As a result, by means of the ejection and closing screw conveyor 7 flour is ejected from the vessel 3. The regulating valve 16 limits the liquid flow into vessel 4 sufficiently to allow the rate of flour ejectment to unbalance the left side of the scale beam 1, so that it swings somewhat upwards. As a result the regulating contact 5 is again interrupted and the electromotor 8 of the ejector and closing screw 7 is stopped. The ejector and closing screw which is thereby stopped at the same time closes the emptying opening of the vessel 3. The stoppage continues until, as a result of further liquid inflow into the vessel 4, the scale beam 1 comes again into equilibrium and the regulating contact 5 is again closed. As a result the electromotor 8 of the ejector and closing screw 7 is again switched on and the flour is ejected from the vessel 3. In this step the scale beam 1 carries out only very small swings from the point of equilibrium. The ejection of the powder from vessel 3 is periodically stopped by regulating contact 5 opening, but the liquid continues to be introduced in vessel 4.

When the level of the liquid in the vessel 4 has reached the regulating electrode 13, the current circuit is closed over the electrical leads 13', 13'' and through this the relay combination 20 is switched over to switch step III. Through this the supply of current to the magnetic valve 15 is interrupted which has the result that no further flow of liquid to the vessel 4 follows. The ejector and closing screw 7 continue working until the scale beam 1 swings through equilibrium position and away from contact 5. Through this opening of the regulating contact 5 the relay combination 20 is switched onto the next switch step IV.

During this switch step IV the magnetic valve 12 is opened over the electrical leads 12', 12'', as a result of which the liquid in the vessel 4 finds its way in the dough mixing vessel 17. In switching step IV the magnetic valve 15 is in a closed position. the flour previously ejected from the vessel 3 is already in the dough mixing vessel 17. By means of the mixing blade 19, fixed in this vessel, the ejected flour can be mixed with the ejected liquid into a dough or a preliminary dough. The dough or the preliminary dough so made can then be continuously drawn from the mixing vessel.

As soon as the time relay started at the beginning of the switch stage I for the introduction of a new measuring and preparation process is switched, a new switch step is started, which corresponds to switch stage I and which repeats the process described above.

As is apparent from the description given above, in switch step II the scales are loaded by the amount of liquid which was volumetrically measured by means of the electrode 13 in the vessel 4. In switch steps II and III by maintaining a position of equilibrium of the scales and through the action of the regulating contact, an amount of flour corresponding to the amount of liquid is ejected by the ejector and closing screw 7. In this way a mutually determined measuring of the two dough components is ensured, independent of the amounts of flour which previously stuck to the apparatus and the prescribed proportion of the components is always given quite exactly.

In the embodiment of the invention described above flour is used as the powdered material, whereby flour is understood every kind of grain-like product obtained by milling. It is, of course, understood that the process according to the invention and the apparatus appropriate to it offers the same advantages also for other powdered dough components which may easily stick to the sides, which have to be measured in prescribed proportions of amounts relative to liquid dough components. Other such powdered materials are, e.g. groats, malted grain and other dough components which have the consistency of flour such as dried milk, castor sugar, etc.

I claim:

1. An apparatus for accurately regulating proportions of powdery substance and liquid, comprising a pivoted beam; a vessel positioned on said beam to one side of the pivot and equipped with an inlet and outlet means for respectively receiving and discharging said powdery substance; a second vessel positioned on said beam to said one side of the pivot equiped with an inlet and outlet for respectively receiving and discharging said liquid, said liquid having a predetermined weight and volume ratio relative to the desired amount of powdery substance; a counterweight positioned on said beam on the other side of said pivot; and electrical contact means on said beam to open and close an electrical relay circuit so that as a portion of said powdered substance is released through said outlet and the equilibrium of the pivoted beam is affected, liquid is introduced to said liquid vessel to compensate therefor, this cycle being continued until the liquid in said liquid vessel reaches a nominal volumetric height then said liquid is discharged.

2. An apparatus as in claim 1 wherein said liquid vessel contains a control means which, when the nominal volumetric height of liquid is in said liquid vessel, causes the electrical relay circuit to close said liquid vessel inlet and open said liquid vessel outlet.

3. An apparatus as claimed in claim 1 wherein the outlet of said powdery substance vessel has an ejector and an ejector driving means and said liquid vessel has magnetic valves in its inlet an outlet, the operation of said driving means and said valves being controlled by said electrical relay circuit which in turn is controlled by the movement of said beam and said contact means.

4. An apparatus as claimed in claim 1 wherein said powdery substance is flour, said liquid is water and the claimed regulating apparatus is to be placed above a mixing vessel for preparing doughs.

5. An apparatus as claimed in claim 1 wherein said powder vessel outlet means has an ejector driving means powered by an electric motor, and the outlet of said liquid vessel is regulated by a magnetic valve which is in open position when said liquid inlet is closed and when said electric motor of said ejector driving means is switched off.

6. An apparatus as claimed in claim 1 wherein said liquid and powdery substance vessels are relatively adjustable to each other along said pivoted beam in order to determine the proportionate amounts of powdery substance and liquid.

7. An apparatus as claimed in claim 6 wherein said liquid vessel is adjustable on said beam and said powdery substance vessel is fixed thereto.

References Cited

UNITED STATES PATENTS

| 1,790,813 | 2/1931 | Halloran | 177—70 X |
| 2,316,631 | 4/1943 | Bliss | 177—70 |
| 2,720,376 | 10/1955 | Haglund | 177—70 X |
| 3,101,801 | 8/1963 | Miller | 177—70 |

STEPHEN J. TOMSKY, *Primary Examiner.*

G. H. MILLER, JR., *Assistant Examiner.*